(No Model.)
C. T. THOMPSON.
BICYCLE TIRE.
No. 566,247. Patented Aug. 18, 1896.
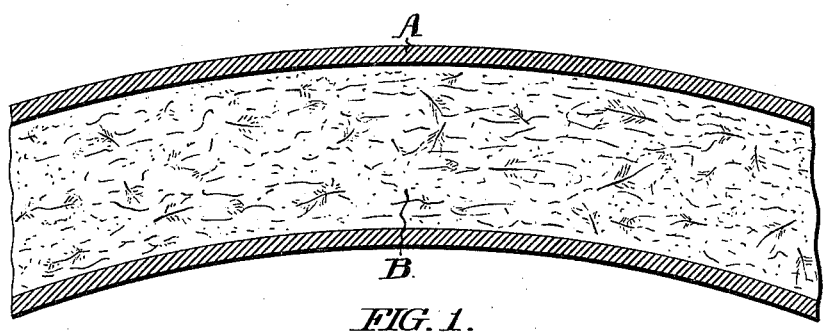
FIG. 1.
FIG. 2.
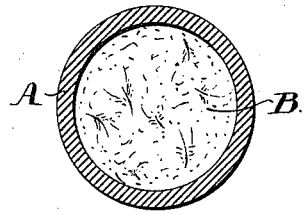
WITNESSES:
INVENTOR:
Charles T. Thompson

UNITED STATES PATENT OFFICE.

CHARLES T. THOMPSON, OF PHILADELPHIA, PENNSYLVANIA.

BICYCLE-TIRE.

SPECIFICATION forming part of Letters Patent No. 566,247, dated August 18, 1896.

Application filed December 17, 1895. Serial No. 572,388. (No model.)

*To all whom it may concern:*

Be it known that I, CHARLES T. THOMPSON, of Philadelphia, in the State of Pennsylvania, have invented certain new and useful Improvements in Bicycle-Tires, whereof the following is a specification, reference being had to the accompanying drawings.

In said drawings, Figure 1 represents a longitudinal section through a segment of a tire embodying my improvement, and Fig. 2 is a transverse section thereof.

The purpose of my invention is to avoid the results ordinarily due to the puncture of a pneumatic tire, and the method of operation of the device may be stated as twofold, viz: first, in that it tends to prevent the escape of air at the puncture, and, second, in that it minimizes the consequences of such escape in the case of failure to prevent it altogether.

Referring to the drawings, A represents an ordinary pneumatic tire, the rim, spokes, &c., not being shown, as the invention is of course adapted for use in connection with any form of pneumatic tire.

The tire itself is tubular in form and preferably of rubber. Within the interior of the tubular tire A, I provide a filling of feathers, (indicated at B.) It is desirable that the filling should be of comparatively fine feathers, containing a large amount of down, and as far as possible uniform, but I of course do not limit myself to the use of any specific kind or grade of feathers. The amount of filling should be such as to present a substantial resistance to pressure on the tube, even when emptied of air, but should not be so dense as to prevent the free circulation of air when the tube is being inflated.

I find that with this device when a puncture occurs the first tendency is for the down to be carried into the aperture by the outgoing current of air. In some cases where the aperture becomes clogged immediately by the entrance of a piece of the filling, the further escape of air is prevented or substantially retarded. Even, however, when this does not occur, the filling itself preserves to a very substantial degree the elasticity of the tire, and thus prevents the disabling of the bicycle, which would result from collapse.

The filling adds but little to the weight of the tire, and in no way affects its pneumatic character, it being practically impossible to detect the presence of such filling when the tire is completely inflated, except by the slight addition to the weight before noted.

I am of course aware that the use of fillings, such as cork, &c., has been suggested for bicycle-tires, and I do not broadly claim the use of such fillings; but

I claim—

The combination with a pneumatic tire, of an internal filling of feathers, substantially as set forth.

CHAS. T. THOMPSON.

Witnesses:
   G. HERBERT JENKINS,
   JAMES H. BELL.